United States Patent [19]
Taskett et al.

[11] Patent Number: 6,044,247
[45] Date of Patent: Mar. 28, 2000

[54] METHODS AND APPARATUS FOR PAGING SYSTEMS

[75] Inventors: John M. Taskett, Salt Lake City, Utah; Charles R. Chamberlain, Arlington, Va.

[73] Assignee: American Express Travel Related Services Company, Inc., New York, N.Y.

[21] Appl. No.: 08/732,177

[22] Filed: Oct. 16, 1996

[51] Int. Cl.[7] .............................. H04M 17/00; H04Q 7/06
[52] U.S. Cl. ....................... 455/31.2; 379/88.26; 379/114
[58] Field of Search ................................. 455/31.2, 31.3, 455/408; 379/88.19, 88.2, 88.21, 88.25, 88.26, 114, 121, 142, 144

[56] References Cited

U.S. PATENT DOCUMENTS

| | | | |
|---|---|---|---|
| 5,353,335 | 10/1994 | D'Urso et al. | 379/88.2 |
| 5,504,808 | 4/1996 | Hamrick, Jr. | 379/144 |
| 5,675,627 | 10/1997 | Yaker | 455/558 |

FOREIGN PATENT DOCUMENTS

| | | |
|---|---|---|
| 2947164 A1 | 7/1979 | Germany . |
| 6-165245 | 6/1994 | Japan . |
| WO 93/18624 | 9/1993 | WIPO . |
| WO 97/33416 | 9/1997 | WIPO . |

*Primary Examiner*—Andrew M. Dolinar
*Attorney, Agent, or Firm*—Snell & Wilmer L.L.P.

[57] ABSTRACT

An improved paging system including a transmitter and a call controller. An incoming call trunk, a memory device, an outgoing call trunk, and a central processing unit make up the call controller. A paging party connects to the call controller though the incoming call trunk and enters a phone number. The phone number is stored in the memory device, and the subscriber is notified of the page via the transmitter. To dial the phone number left by the paging party, the subscriber connects to the call controller through the incoming call trunk and enters an authorization code associated with a prepaid electronic account stored in the memory device. The central processing unit retrieves the stored phone number from the memory device and connects the subscriber directly to the phone number. During the duration of the phone call, the balance of the prepaid account is incrementally decreased by the central processing unit. Further included are a message database for storing messages left by the paging party, and a billing summary that is remotely configurable to a format preference indicated by the subscriber. Credit may also be added to the balance of the prepaid account while connected to the call controller, and any destination phone number may be dialed through the call controller, whereby the balance of the prepaid account is decreased during the duration of the call connection.

35 Claims, 11 Drawing Sheets

PAGING CARD—DETAILED ACTIVITY REPORT
MARCH 21, 1996
PAGING CARD NUMBER (LAST 4 DIGITS ONLY): 4444

CALLING ACTIVITY 800

| DATE | TIME | CALLED FROM | FROM/LOCATION | CALL TO | CALL/LOCATION | SPEED DIAL | MINUTES | COST |
|---|---|---|---|---|---|---|---|---|
| 1/3/97 | 1:05AM | (222) 555-0000 | SALT LAKE UT | (111) 555-0010 | TUCSON AZ | Y | 6 | $ 3.75 |
| 1/4/97 | 9:15AM | (222) 555-0001 | SANDY UT | (111) 555-0009 | DAYTON OH | Y | 12 | $ 6.94 |
| 1/4/97 | 9:28AM | (222) 555-0002 | SALT LAKE UT | (111) 555-0008 | SAN JOSE CA | | 20 | $ 17.50 |
| 1/20/97 | 8:03AM | (222) 555-0003 | ATLANTA GA | (111) 555-0007 | PORTLAND OR | | 36 | $ 17.50 |
| 1/22/97 | 9:02AM | (222) 555-0004 | BRIGHTON NY | (111) 555-0006 | NEW YORK NY | Y | 3 | $ .90 |
| 1/30/97 | 3:40PM | (222) 555-0005 | BRIGHTON NY | (111) 555-0005 | DAYTON OH | Y | 4 | $ 1.21 |
| 2/02/97 | 3:38PM | (222) 555-0006 | SALT LAKE UT | (111) 555-0004 | TUCSON AZ | | 2 | $ .53 |
| 2/10/97 | 7:40PM | (222) 555-0007 | SANDY UT | (111) 555-0003 | PHOENIX AZ | | 4 | $ .97 |
| 2/12/97 | 8:03AM | (222) 555-0008 | ATLANTA GA | (111) 555-0002 | DAYTON OH | Y | 12 | $ 6.94 |
| 2/14/97 | 9:10AM | (222) 555-0009 | PHOENIX AZ | (111) 555-0001 | LONDON ENG | | 62 | $ 32.00 |

FIG. 8A

INFORMATION SERVICES ACTIVITY

DETAILED ACTIVITY REPORT
840

| | | | | | | 804 |
|---|---|---|---|---|---|---|
| 3/5/97 | 2:40PM | (222) 555-0003 | ATLANTA GA | (111) 555-0007 | PORTLAND OR | $ 7.50 |

RECHARGE ACTIVITY

INITIAL PURCHASE—$15 CARD

| DATE | TIME | AMOUNT CHARGED | CHARGED TO | INITIAL UNITS | UNITS PURCHASED | FINAL UNITS | |
|---|---|---|---|---|---|---|---|
| 1/4/97 | 7:00AM | $ 100.00 | AMERICAN EXPRESS | 16 | 211 | 227 | REMAINING UNITS: 122 |

806

REPORT AND SERVICE PROVIDED BY AMERICAN EXPRESS TELECOM
SALT LAKE CITY, UTAH
FOR 24 HOUR SERVICE CALL TOLL FREE: (800) 555-5555
850
852

FIG. 8B

METHODS AND APPARATUS FOR PAGING SYSTEMS

TECHNICAL FIELD

The present invention relates, generally, to wireless paging systems, and more particularly, to wireless paging systems that facilitate connection by a subscriber to a call controller with an instrument such as a prepaid telephone card.

BACKGROUND ART AND TECHNICAL PROBLEMS

Wireless paging systems are generally well-known. In such systems, a calling party wishing to send a message ("page") to a person ("subscriber") using a paging receiver ("pager") simply dials a special phone number or a phone number and personal identification number ("PIN"). A call controller or message center then prompts the paging party to enter a numeric message (e.g., a telephone number, a special code, a pricing update, a PIN or the like) or an alphanumeric message (e.g. a limited text message restricted to 240 characters in length). Generally, input of a numeric message may be facilitated using a keypad on a touch tone telephone while the entry of an alphanumeric message requires the assistance of a human operator or a special entry terminal or computer with modem. Next, the call controller transmits the message to the subscriber by transmitting RF signals comprising the calling party's message and identification codes to the subscriber's if the pager is paged within the range of a paging transmitter. The pager then compares the received identification codes with internal codes; if the received codes and internal codes match, the pager visually displays to the subscriber the numeric or alphanumeric message.

These paging systems have many drawbacks. For example, if the message is a numeric message representing a phone number that the subscriber is to call, the subscriber generally needs to carry around extra or unwanted coins in the event the nearest or most accessible telephone is a public pay-phone. Moreover, in the event that the phone number is a long-distance phone call, an increased number of coins are required. Returning long-distance calls from inside a customer's business is also inconvenient or troublesome as calls made from these phones are typically billed to the customer in a monthly statement, and it is difficult if not impossible for the subscriber to know, at the time of the call, how much a single long distance phone call cost.

Another inconvenience encountered by the subscriber lies in the telephone number left by the calling party. It may be difficult for a subscriber to remember the calling party's phone number displayed on the pager long enough to return the call; the subscriber may easily forget the number if that person is not able to immediately return the phone call. Expensive pagers deal with this problem by including a memory within the pager that stores a plurality of numbers/messages for access by the subscriber at a later time. However, these pagers have a limited amount of storage space and, at the very least, require more expensive hardware to facilitate the storage of the phone numbers.

Subscribers may also choose not to answer each page as they come in but may wait and return, at one time, all the pages that have accumulated over a period of time. This can, depending on the number of incoming pages, require a lot of time dialing and entering numbers from the telephone keypad to return all the calls. Also, the possibility of a wrong number being dialed increases with the number of calls being placed.

Still further, many pagers do not have the capability of displaying alphanumeric messages, and the ones that do are limited by the length of the message that can be displayed.

Consequently, there exists a long-felt need for an improved paging system that overcomes the disadvantages associated with prior paging systems. The present invention allows the subscriber to place calls to phone numbers left by callers without requiring additional coins or concern about which phone is being charged for the call; eliminates the need for subscribers to remember phone numbers left by callers; increases the speed and accuracy in which phone numbers may be dialed by the subscriber; and increase the length of messages relayed to the subscriber.

SUMMARY OF THE INVENTION

The present invention provides methods and apparatus for receiving and returning pages charged to an electronic account including a transmitter and a call controller. The call controller comprises an incoming call trunk, a central processing unit, a memory device, an account database, and an outgoing call trunk.

Another aspect of the invention is a method and apparatus where a paging party connects with the call controller though the incoming call trunk and enters a message including a phone number, such as the paging party's phone number. The phone number is stored in the memory and the subscriber is notified of the message via the transmitter. To place a call to the number left by the paging party, the subscriber connects to the call controller and enters an account code associated with a prepaid or post-pay account stored in the account database. Upon verification of the validity of the account code, the central processing unit retrieves the phone number stored in the memory and connects the subscriber directly to the phone number. During the duration of the phone call between the subscriber and the called party, the balance of the account is incrementally decreased or increased by the central processing unit, depending on whether the account is a prepaid account or post-pay account, respectively.

Another aspect of the invention is a method and apparatus where the call controller includes a message database. The paging party leaves a voice message that is stored in the message database for retrieval by the subscriber at a later time. Alternatively, the balance of the prepaid account is decreased in relationship to the extent that this messaging feature is used. For example, the prepaid account may be decreased by a predetermined amount for each message left by a caller, or the prepaid account may be decreased according to the number or time duration of voice messages read by the subscriber.

Another aspect of the invention is a method and apparatus where the subscriber remotely configures a portion of data in a transaction database according to a format preference indicated by the subscriber. The data is generated and transmitted to the subscriber in accordance with the format preference.

Another aspect of the invention is a method and apparatus where the subscriber adds additional credit to the balance of a prepaid electronic account while connected to the call controller or combines balances of different prepaid accounts.

Still another aspect of the present invention is a method and apparatus where the subscriber enters a destination phone number of a third party. The call controller connects the subscriber to the destination phone number and the call controller decreases the balance of the prepaid account during the duration of the call connection to the third party.

BRIEF DESCRIPTION OF THE DRAWING FIGURES

The present invention will hereinafter be described in conjunction with the appended drawings and figures.

FIG. 8 is a schematic diagram of a format of a summary transaction data;

DETAILED DESCRIPTION OF THE INVENTION

A preferred embodiment of the present invention includes a wireless paging system that facilitates subscriber transactions in accordance with a prepaid transaction instrument or paging card. It should also be appreciated that the transaction instrument may be a post-pay card where the account balance is increased instead of decreased as in the case of prepaid instruments. A discussion of prepaid transaction instruments and prepaid telephone cards is disclosed in pending U.S. patent applications Ser. No. 08/456,525 entitled "Methods and Apparatus for Providing a Prepaid, Remote Memory Customer Account," filed Jun. 1, 1995 by John Taskett; Ser. No. 08/503,071 entitled "Method and Apparatus for Generating Summaries of Prepaid Instrument Transaction Activity," filed on Jul. 14, 1995 by John Taskett; Ser. No. 08/510,590 entitled "Methods and Apparatus for Providing a Prepaid, Remote Entry Customer Account for the Visually Impaired," filed on Aug. 2, 1995 by John Taskett and Barbara Piernot; Ser. No. 08/510,196 entitled "Methods and Apparatus for Providing a Prepaid, Remote Entry Customer Account for the Hearing Impaired," filed on Aug. 2, 1995 by John Taskett; the disclosures of which are incorporated herein by reference; and, issue U.S. Pat. No. 6,684,291 entitled "Refundable Prepaid Telephone Card," issued Nov. 4, 1997 to John Taskett; U.S. Pat. No. 5,762,376 entitled "Methods and Apparatus for Providing a Prepaid, Remote Entry Customer Account Having Multiple Language Capability," issued on Jun. 9, 1998 to John Taskett.

Figure 1:
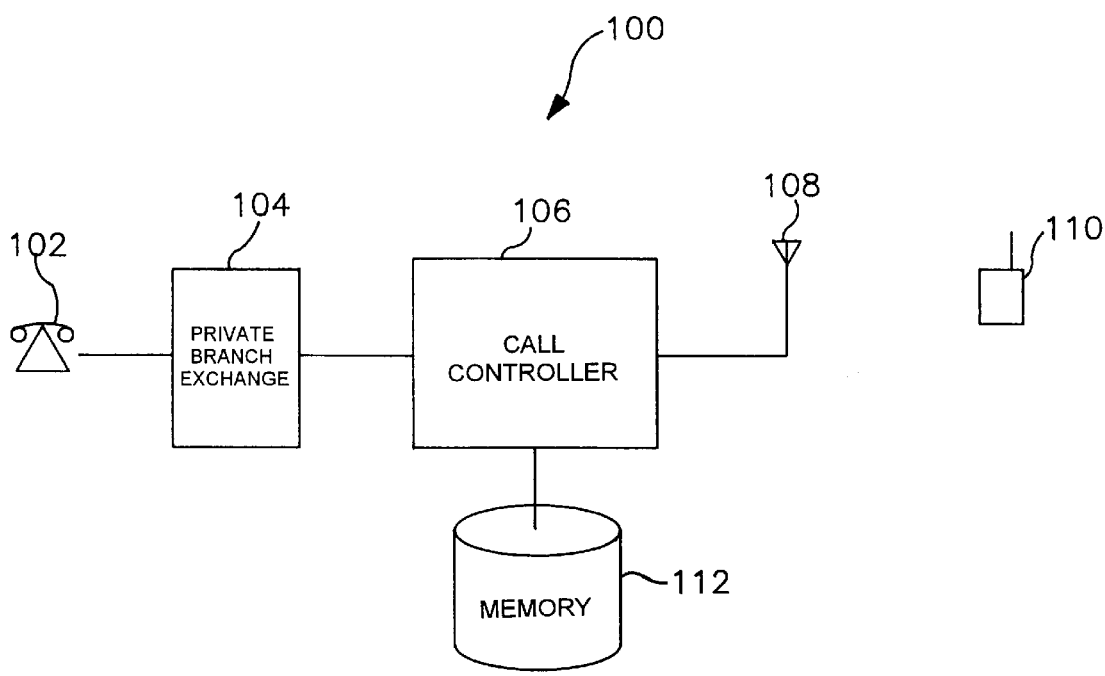
FIG. 1 is a schematic block diagram of a paging system.

Shown in FIG. 1 is a block diagram of a wireless paging system 100. A call controller or message center 106 is coupled to a radio transmitter 108 which is preferably land-based. Alternatively, the system 100 includes a plurality of land-based and/or satellite transmitters. Those skilled in the art will appreciate that call controller 106 includes suitable computing hardware capable of effecting the functions set forth herein. When a calling party desires to page a particular subscriber, the calling party dials a predetermined phone number corresponding to that subscriber from a calling station 102, such as a private or public telephone. The phone number may be a local phone number, a toll-free phone number, a general phone number for a group of subscribers coupled with a PIN corresponding to a particular subscriber, or other suitable means for connecting to call controller 106. Controller 106 is advised of which subscriber the page or message should be directed to.

Upon dialing the phone number, telephone 102 is connected to call controller 106 through, for example, a local telephone network including a private branch exchange ("PBX") 104. Call controller 106 then prompts the calling party to enter a phone number to be sent to the subscriber, or it prompts the calling party to leave a voice message to be accessed later by the subscriber. Other features may of course be implemented in the paging system, such as receiving alphanumeric messages, faxes, or other media messages/correspondence to be sent to the subscriber. In any event, the calling party may select the appropriate option by using a keypad on telephone 102. In another embodiment of the invention, call controller 106 includes voice recognition circuitry allowing the calling party to simply speak the desired option to call controller 106.

If the calling party chooses to leave a phone number for the subscriber, call controller 106 prompts the calling party for the number. U.S. domestic calls are typically 10 digits or less, and international numbers may be longer. In accordance with a preferred embodiment, the calling party simply enters the phone number with the keypad followed by a pound sign (#) to signify the end of the message. The caller may also hang-up when the entry of the phone number has been completed to signify the end of the message. In accordance with another embodiment of the present invention, call controller 106 determines the calling party's number without requiring the calling party to enter such information directly. For example, call controller 106 determines the calling party's phone number by ANI or caller ID.

Call controller 106 stores the phone number in a memory or database 112. Call controller then notifies the subscriber of the numeric message by sending a signal through transmitter 108 to a pager 110 carried by the subscriber. Preferably, data representing the phone number left by the calling party is sent to a pager 110 so that the phone number may be displayed to the subscriber via a display device (not shown) on pager 110. Alternatively, instead of dispatching the phone number to pager 110, call controller 106 stores the number and sends a signal to pager 110 notifying the subscriber that a phone number has been left by a calling party. This feature is particularly useful in paging systems where the pager hardware being used by subscribers is not sophisticated or has no display device, such as a disposable paging device.

In accordance with an embodiment configured to receive voice messages, if the calling party chooses to leave a voice message, the calling party simply speaks the message into phone 102. The message is then sent to the subscriber's mailbox by entering # from the keypad or hanging up the receiver of phone 102. Additional features may be incorporated in the voice messaging option. For example, the calling party may have the option of reviewing or editing their voice message prior to it being sent to the subscriber's mailbox. Additionally, the subscriber may have the option of requiring the calling party to enter a special code in order to access the voice messaging service, reducing unnecessary communications and costs. Upon entry of a voice message into the system, call controller 106 stores the voice message in memory 112. Call controller 106 then notifies the subscriber by sending a signal via transmitter 108 to pager 110. The signal may be a predetermined tone or a message to be displayed by pager 110.

Figure 2:
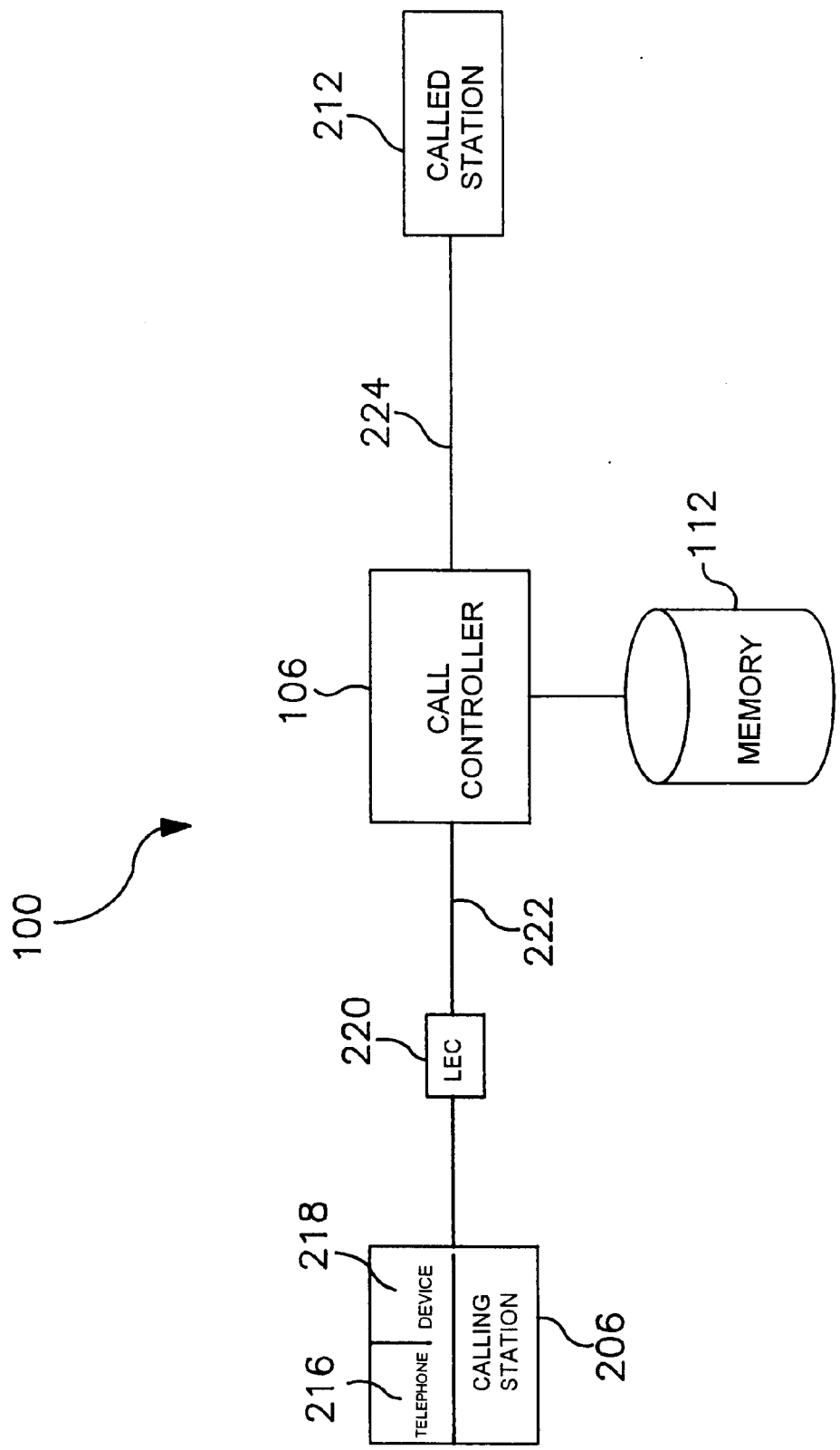
FIG. 2 is a block diagram of the paging system of FIG. 1 showing how it is to be configured for receiving a call from a subscriber.
Figure 3:
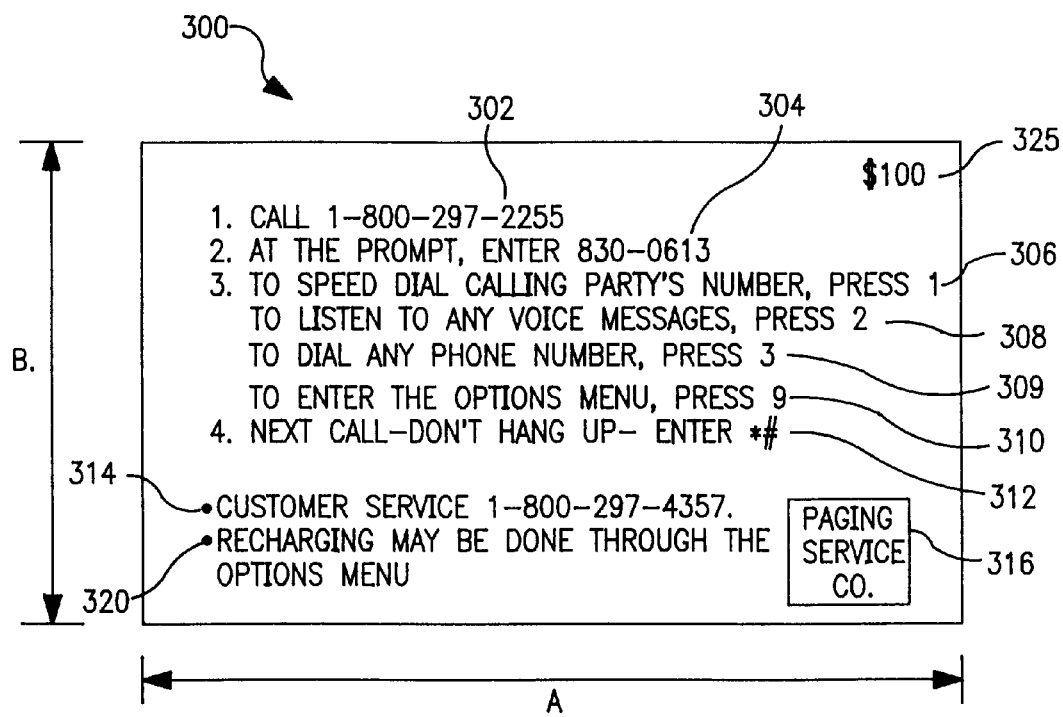
FIG. 3 is a view of a prepaid paging card.

Referring now to FIG. 2, a subscriber may respond to a page either alphanumeric or voice, by placing a call from a calling station 206 to calling controller 106 using a transaction card or paging card 300 (see also FIG. 3). Preferably, calling station 206 comprises a telephone 216 including a keypad, and a device 218 for reading magnetic strip data, bar code data, smart card data or the like. Upon calling controller 106, the subscriber's call is suitably routed to the controller by way of a local exchange carrier ("LEC") 220.

As shown in FIG. 3, a transaction card or paging card 300 is analogous physically to a credit card instrument. Typically, these cards may be comprised of paper, plastic, cardboard, or any other suitable material. In accordance with a preferred embodiment, paging card 300 comprises plastic in the range of 8.5–8.7 cm (dimension A) in length, in the range of 5.3–5.5 cm (dimension B) in height, and in the range of 0.65–0.85 mm in length.

Paging card 300 includes an access telephone number 302 for accessing call controller 106 and an authorization code/account number 304 for accessing an account database in memory 112 (see also FIGS. 1 and 2). Access telephone number 302 may be a toll-free 800 number, a 900 number, a local phone number or the like. Authorization code 304 is a number which is, preferably, unique to the particular paging card 300, and is generally a unique predetermined number that is printed on transaction card 300 before it is issued to the subscriber. Alternatively, authorization code 304 may be selected by the individual subscriber. In accordance with this aspect of the invention, the subscriber informs call controller 106 of the selected code number so that a corresponding account may be set-up in the account database of call controller 106.

Additionally, card 300 includes instructions explaining how to retrieve messages and place phone calls through call controller 106. These instructions may be in a single language like English or, alternatively, in a plurality of languages.

In accordance with a preferred embodiment, line 1 of the instructions set forth telephone number 302 which is needed to access host computer 106 which maintains the account where funds are to be withdrawn for retrieving voice messages, placing telephone calls, or other transactions. The instructions on card 300 then directs the subscriber at line 2 to enter authorization code 304. A bar code, magnetic code or other suitable indicia of authorization code 304 may also be placed on instrument 300 which maybe read by a suitable bar code reader or other scanning device. In this manner, the subscriber would not need to manually enter authorization code 304.

At line 3 of the instructions, the subscriber is instructed on how to speed dial a phone number left by a calling party; how to retrieve any voice messages; to dial a telephone number; or to enter the options menu. At line 4, instructions for placing additional calls are printed. Further, paging card 300 includes instructions 320 on how to recharge card 300 with additional units for using the services associated with call controller 106 (i.e., increasing the account balance in that account database). Card 300 may also include an instruction 116 on how to contact customer service.

A number value 325 is printed on transaction card 300 to indicate the value or initial amount associated with card 300. The amount may be in currency such as U.S. dollars, units or credits. Once paging card 300 is used, the value of card 300 may fluctuate according to whether transaction charges have reduced the remaining balance in the charge account or whether the subscriber has recharged the balance in the charge account.

Other additional information, drawings, or designs 316 may be suitably printed on card 300, for example, trademarks, service marks or marks for advertising related or unrelated products. The opposite side of paging card 300 may comprise a photograph, drawing or other design (not shown).

It is noted at this point that FIG. 3 is only illustrative and that, given the robust configuration of the present invention, additional information employed in the art may be set forth on card 300.

Referring back now to FIG. 2, upon connection to call controller 106, the subscriber is prompted for authorization code 304. Once account code 304 is validated, call controller 106 informs the subscriber of the number of unread voice messages and the number of stored phone numbers left by callers. Call controller 106 then prompts the subscriber for selecting one of several features associated with the paging system.

In a preferred embodiment of the invention, the subscriber may instruct call controller 106 to speed dial a phone number left by a caller in memory 112. The subscriber is then connected to a called station 212 through a communications link 224. The call connection between the subscriber and called station 212 is monitored by call controller 106, and the balance of the account associated with authorization code 304 is incrementally decreased during the call connection.

In accordance with a further embodiment, the subscriber may instruct call controller 106 to play back voice messages left by callers. A message menu may include other appropriate functional features to aid the subscriber, such as message replay, save message, skip forward in message, skip back in message, erase message, go to next message, go back to previous message, add or edit a personalized greeting, add or change a subscriber security code to keep access to messages confidential, add or change an access security code to limit a calling party's ability to send voice messages, and the like.

In accordance with yet a further embodiment of the invention, the voice messaging feature is included as part of the basic subscriber fee. Accordingly, the balance of the prepaid account may be decreased to the extent the messaging feature is used. For example, the prepaid account is incrementally decreased a predetermined number of units or currency for each message stored. In accordance with an additional feature of the invention, the subscriber may direct Controller 106 to generate a customized billing summary setting forth the specific charges to the account.

In accordance with still another embodiment of the invention, the subscriber may recharge the account balance associated with paging card 300 while connected to call controller 106. For example, the subscriber connects to a customer service representative or a special recharge submenu where the subscriber then transfers funds into the account associated with authorization number 304 using a debit card, credit card, bank account and the like.

In accordance with yet another embodiment, the subscriber may enter a destination telephone number of a desired party and instruct call controller 106 to place a phone call to this desired party. Once the call connection is made, call controller 106 incrementally decreases the balance of the account stored in memory 112. In this manner, the card can be utilized as a standard prepaid calling card.

Figure 4:
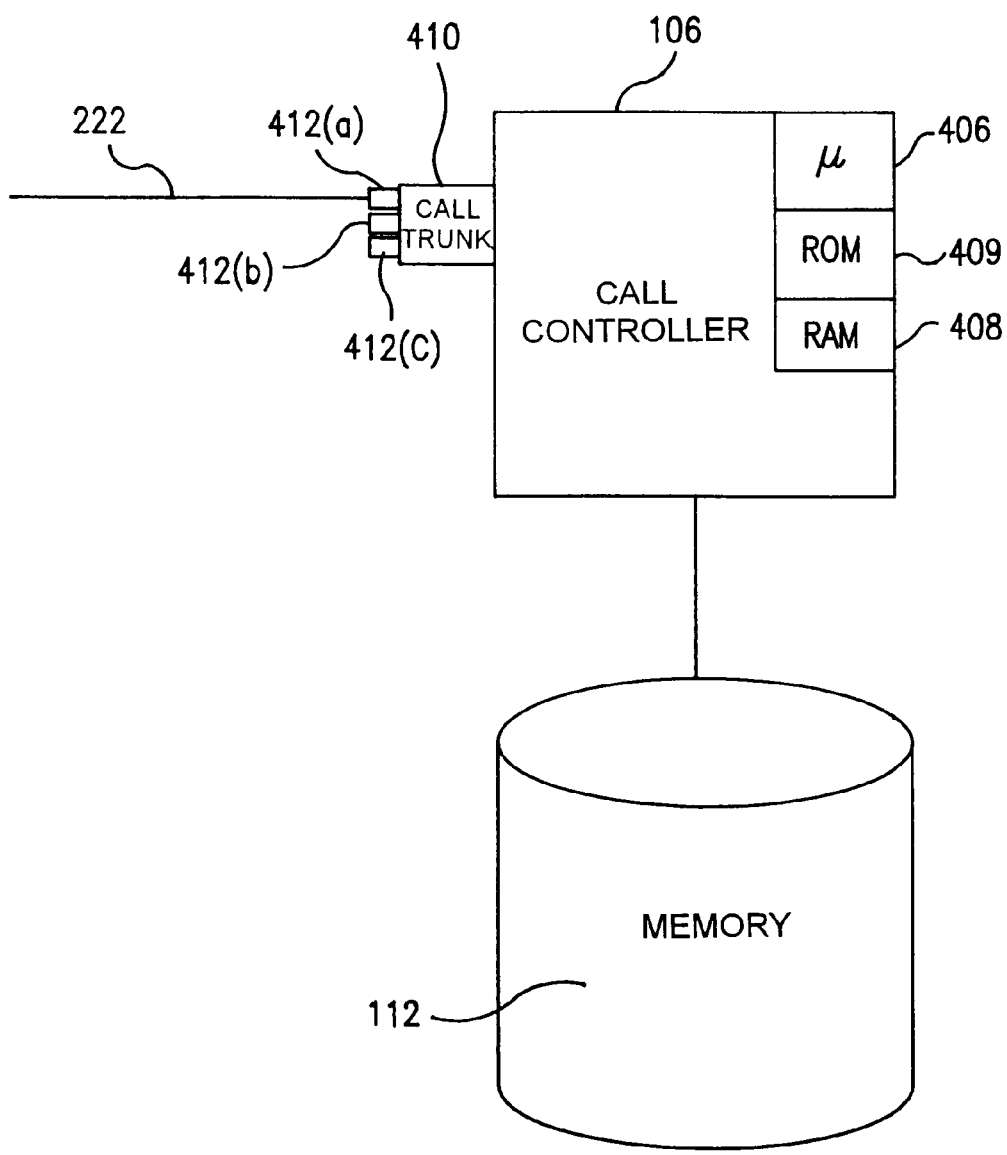
FIG. 4 is a schematic diagram of a call controller.

Referring now to FIG. 4, call controller 106 comprises an incoming call trunk 410, a controller or central processing unit ("CPU") 406, read only memory ("ROM") 409, a random access memory ("RAM") 408, and an additional memory/database 112 such as a ROM, a compact disc-recordable ("CD-R"), a tape drive, or any other recordable medium or combination thereof that is capable of being accessed by processor 406.

Trunk 410 includes one or more incoming telephone lines 412(*a*)–412(*c*). First incoming line 412(*a*) corresponds to a phone number used by a party to page a subscriber. The phone number may be a predetermined 800 telephone number, a 900 telephone number, or the like. Similarly, second incoming line 412(*b*) corresponds to a second predetermined telephone number which may be used to process phone calls in another language such as Spanish. Incoming line 412(*c*) may be used by a subscriber to connect to call controller 106, associated with access telephone number 302. Accordingly, call controller 106 may be configured to accommodate a large number of incoming telephone lines thereby allocating particular feature sets to corresponding telephone lines. More particularly, call controller 106 is configured to process incoming calls from a wide variety of caller hardware configurations, including personal computers, voice telephone extensions, facsimile machines, modems, TTY and TTD devices, and the like. Call controller 106 may be configured to process various incoming calls as a function of the anticipated hardware and other characteristics associated with the incoming call. Moreover, certain incoming lines may be configured to process incoming calls based on non-hardware considerations, such as the type of service provided to a particular clientele using call controller 106.

Processor 406 is configured to retrieve appropriate software modules from memory 408, 409. Processor 406 is configured to prompt and receive pages including phone numbers and voice messages from calling parties; store the messages in database 112; prompt and receive requests from the subscribers; and facilitate other appropriate tasks. The requests from the subscribers may include tasks such as speed dialing the stored phone numbers; playing stored voice messages; dialing a destination phone number; and monitoring the account balance.

Figure 5:
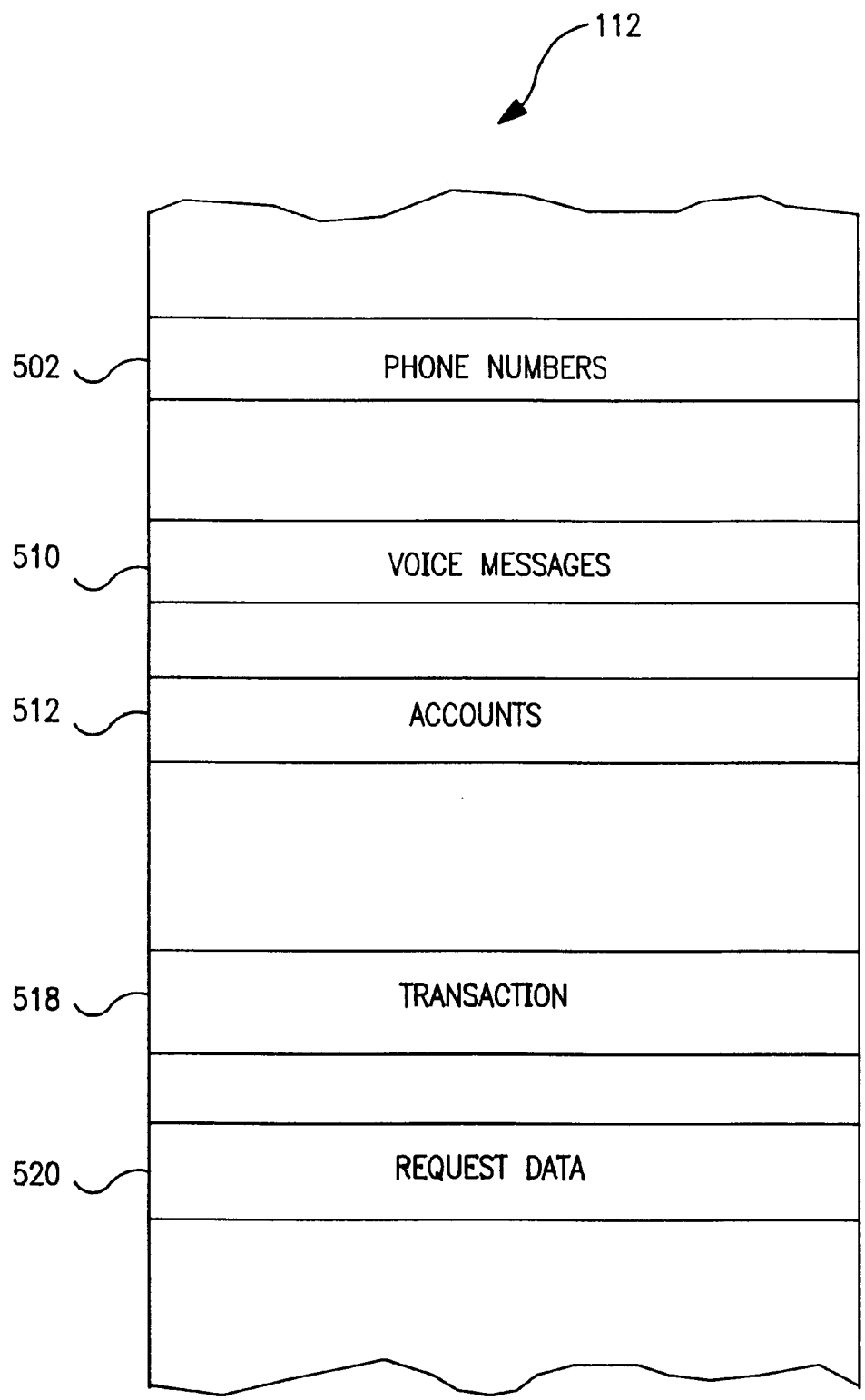
FIG. 5 is a representation of a memory device of the call controller.

Referring now to FIG. 5, a particular embodiment of memory/data base 112 will be described. In particular, memory 112 includes a phone number sector 502 for recording phone numbers left by callers; a voice messages sector 510 for storing voice messages; an account data sector or database 512 for storing information associated with a particular account code; a transaction sector 518 for storing information pertaining to each phone call placed through call controller 106; and a request data sector 520 for temporarily storing formatted requests by the subscriber for summary data. Alternatively, account database 512 or transaction data sector 518 may be stored in separate and distinct memory units or devices.

Figure 6A:
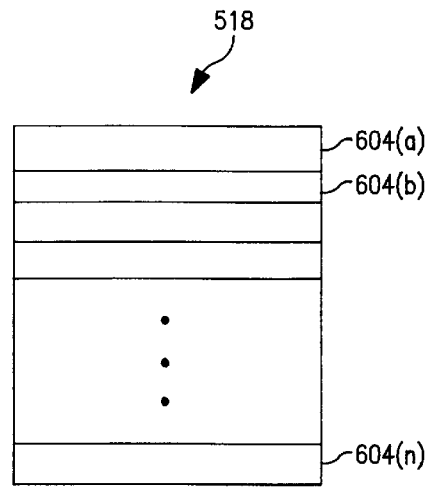
FIG. 6A is a schematic representation of a memory sector setting forth a plurality of requests for summary transaction data.
Figure 6B:
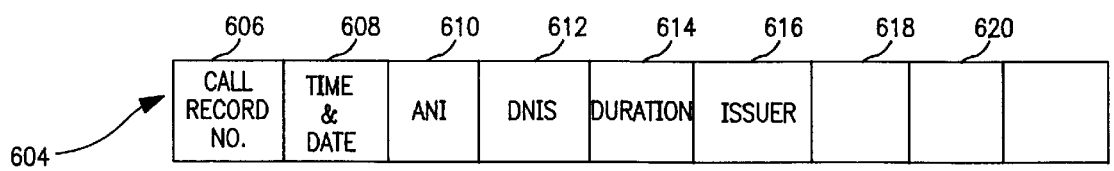
FIG. 6B is a detailed view of one of the request messages shown in FIG. 6A.

As shown in FIGS. 5, 6A and 6B, sector 518 includes transaction data, such as the call records associated with the various accounts maintained by computer 106 in account database 512. More particularly, sector 518 includes call record data pertaining to a particular account corresponding to a particular prepaid transaction instrument or paging card 300.

With specific reference to FIGS. 6A and 6B, memory sector 518 includes a plurality of call records 604(*a*)–604(*n*). Each call record 604(*a*)–604(*n*) corresponds to a particular telephone call placed to a particular account corresponding to a paging card 300. That is, each account may have a plurality of call records associated with it.

Referring to FIG. 6B, each call record 604 embodies a plurality of fields corresponding to various parameters associated with the call. For example, a first field 606 corresponds to a call record number used by call controller 106 to track the various call records associated with various accounts. A second field 608 includes information relating to the time and date the call was placed. A third field 610 relates to the location from which a call was placed, such as the area code, prefix, the four-digit extension, and the city, state and/or country from which the call was placed. A field 612 includes information relating to the destination telephone number, such as the telephone number and city, state, and country of the called party. A field 614 corresponds to the duration of the call (i.e. the minutes and seconds), and information pertaining to the cost of the call such as long distance toll charges or other charges (e.g., 900 number fees, access fees, on-line service fees, and the like). A field 616 contains information relating to the issuer of the card particularly if the issuer of the card is different from the company which maintains call controller 106. If desired, a subsequent field 618 embodies information pertaining to the account holder, whether as an individual or as an employer or affiliate of an organization.

Lastly, one or more additional fields 620 permits the operator of call controller 106 to customize call record data in accordance with their particular accounting, inventory, and cost allocation preferences.

Figure 7A:
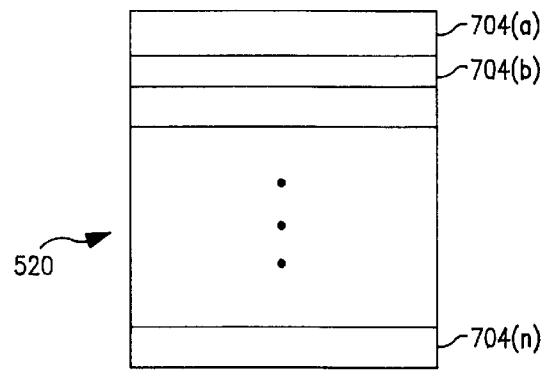
FIG. 7A is a memory sector setting forth a plurality of call records for a particular account.
Figure 7B:
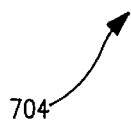
FIG. 7B is a detailed view of one call record shown in FIG. 7A.

Referring now to FIGS. 7A and 7B, call controller 106 is configured to selectively retrieve some or all of the call record data from sector 518 and format and transmit the data to a subscriber or authorized requesting party. In particular, a subscriber may request the number of calls made within a predetermined number of days, or request the last predetermined number of calls, or request all calls relating to a particular account. In addition, the request may include selected fields 606–620 (see FIG. 6B) for some or all of the call records. That is, a subscriber may request the date, duration, and/or destination of various calls. Alternatively, a subscriber may request the precise time calls were made; the location from which the calls were made, or any combination of information from the fields of the call record. In addition, the summary data requested by the subscriber may be configured in a manner most useful to that party. For example, a plurality of predetermined summary data formats may be stored as templates in call controller 106 and selected by the subscriber, or the subcriber may customize the format of the summary data to his/her own liking.

Referring to FIGS. 4, 7A and 7B, a subscriber's request for summary data is received by call controller 106 via trunk 410 as discussed above in connection with FIG. 4. Upon receiving a request for summary data, CPU 406 retrieves a predetermined subroutine from memory 408, 409 which is configured to process the request. In accordance with the preferred embodiment, the subroutine maybe configured to receive requests in the format of voice, DTMG signals TTY or TTD signals or the like. If the request for summary data is in the form of a TTY or TTD signal, or comes from a PC via a modem, or some other modality call controller 106 is configured to handle the message and communicate with the subscriber in a manner compatible with the format and communication protocol of the request. When a request for summary data is received by call controller 106, the request is formatted and temporarily stored in request data sector 520 within memory 112.

As shown in FIGS. 7A and 7B, request sector 520 includes a plurality of individual requests 704(a)–704(n). Each request 704 within data sector 520 includes a plurality of fields. For example, a first field 706 contains information regarding the request number used by call controller 106 for tracking the request within the system. In addition, the request number in field 706 indicates the position within the queue, comprising the various requests, occupied by the request. A second field 708 includes the time and date the request was received. A third field 710 includes information pertaining to the location of the requesting party, such as the telephone number, city, state, country; and issued U.S. Pat. No. 5,923,734 entitled "Methods and Apparatus for Providing a Prepaid, Remote Memory Transaction Account with Voice Indicia," issued on Jul. 13, 1999 to John Taskett.

A fourth field 712 includes the requested particular account numbers and summary data. A fifth field 714 may include security information, such as a PIN or the like. It may be advantageous to provide access to the summary account request feature to persons in addition to, or other than, the individuals in possession of the account numbers. For example, in the context of company issued prepaid instruments or paging cards for employees, the employee subscribers have access to their respective account numbers for using the card, but the employer's accounting department may request summaries of transaction activity for the purpose of compiling tax and accounting records or to audit the spending habits of the company's employees.

A sixth field 716 includes one or more subfields for storing specific requests for calls that are to be on the report, including by the specifically requested information relating to such calls. A field 718 suitably contains one or more subfields that permit the requesting party to specify or otherwise configure the format of the summary data to be transmitted to the requester. For example, the requestor may wish to have the summary data formatted in a manner consistent with a particular company's internal accounting documents. Alternatively, a company may prefer to have call data compiled by region (e.g. area code) rather than chronologically.

A destination field 720 includes the destination where the summary data should be sent. For example, destinations include a fax number, a remote PC file, a postal address, an interactive voice response machine, or the like. A payment field 722 includes the method that the requesting party would like to use to pay for the transaction summary. In a preferred embodiment, call controller 106 is configured to deduct the cost of preparing and transmitting the transaction summary from the account relating to the data. Alternatively, the charge for the summary service may be deducted from any other account, for example a credit card, or may be billed to the requesting party. Various other fields and/or subfields 724 may also be incorporated into request message 704 in addition to or in lieu of one or more of the above described fields.

With reference to FIGS. 4, 6 and 7, call controller 106 is configured to store data summary requests 704 in request sector 520. In this manner, call controller 106 may periodically poll sector 520 to detect the presence of summary data requests and process them at that time, or it may process all the requests at one time in a batch environment. In any event, upon processing the request, CPU 406 transmits the summary data report to the requested destination over a communication link, or prints the report so that it may be mailed to the requestor.

As shown in FIG. 8, a summary report 800 is capable of being formatted in virtually any desirable manner. As mentioned above, one or more default formats may be employed by call controller 106 in addition to a plurality of predefined alternate formats which may be advantageously selected by the subscriber in his request for summary transaction data. It may also be desirable to permit the subscriber to customize an existing format or design a new format unique to the subscriber.

In accordance with a preferred embodiment summary data sheet 800 is divided into a plurality of groups or sections. A first group 802 relates to telephone call activity and includes data pertaining to specific telephone calls such as the date and time of the telephone call 820, 822, the origin of the phone call 824, 826, the destination of the phone call 828, 830, whether the call was placed through the speed dial feature 832, the length of the call 834, and the cost of the call 836. A second group 804 relates to service activity, such as charges incurred by a subscriber for using special features or services like the speed dial feature, storing or retrieving voice messages, generating a report summary, and receiving faxes from a caller. A charge 840 is shown for generating a detailed activity report. A third group 806 relates to the status of the account relating to the transaction activity. Such activity includes the available balance in the prepaid account, additional recharging employed to replenish the account, and the like. In addition, other information may be provided on summary 800, like the name, address, and telephone number of the issuer of the paging card 850, a customer service phone number 852 relating to the entity providing the transaction data summary service, and any other advertising material.

Figure 9A:
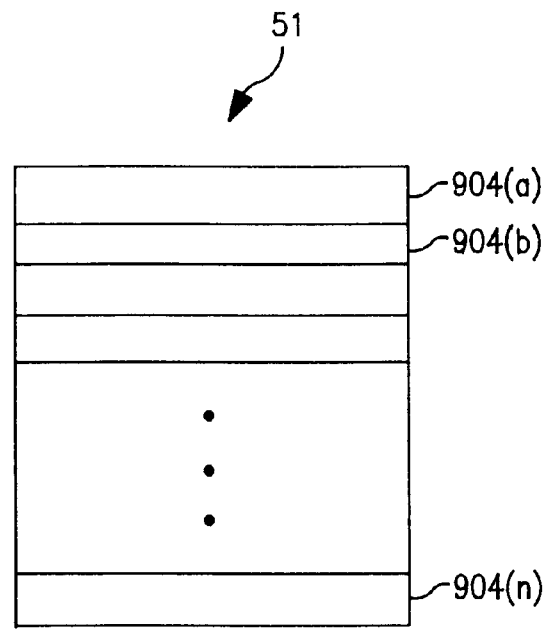
FIG. 9A is a schematic representation of a memory sector for storing various voice messages for retrieval by a subscriber.

Referring now to FIG. 9A, voice message sector/database 510 of memory 112 is shown. Voice message sector 510 includes a plurality of records 904(a)–904(n), each record corresponding to a particular voice message left by a calling party for the subscriber.

Figure 9B:
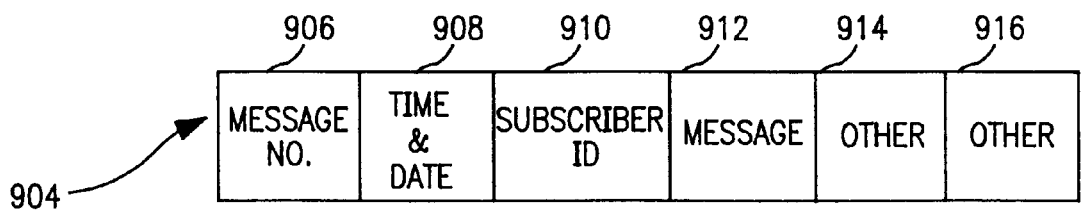
FIG. 9B is a detailed view of a call record of FIG. 9A.

As shown in FIG. 9B, each record 904 embodies a plurality of fields corresponding to various parameters associated with the message. For example, a first field 906 corresponds to a message number used by call controller 106 to track records within database 510. A second field 908 includes the time and date of the calling party. A third field 910 tracks an identification number of the subscriber for whom the message is intended, for example, the telephone number associated with the subscriber's pager or some other number used to distinguish messages intended for different parties. A fourth field 912 includes the message left by the calling party. In a preferred embodiment, the message is a voice message, however, the message may also be a facsimile, computer data or any other alphanumeric message. One or more additional fields 914, 916 may include other appropriate information for use by the subscriber or call controller 106.

Figure 10:
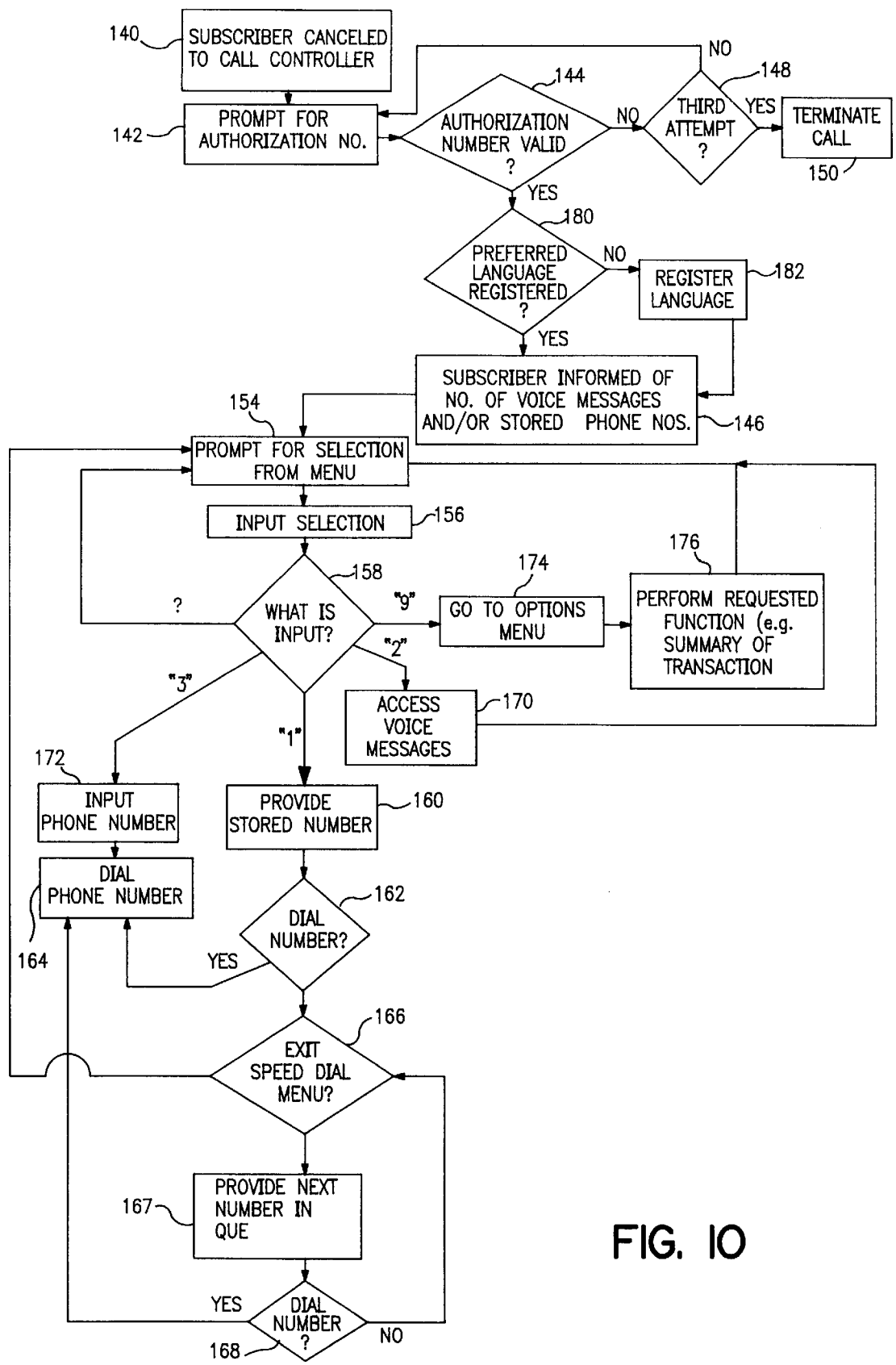
FIG. 10 is a flowchart showing a operation sequence for a paging system.

Referring now to the flowchart of FIG. 10 with reference to FIGS. 1–9, a method for using paging card 300 in the context of call controller 106 will now be discussed. While the method may be implemented entirely with hardware such as digital devices and logic circuits, a preferred embodiment is implemented, at least in part by a computer, through a computer readable program code that is stored in a computer usable medium like memory 408, 409.

In accordance with a preferred embodiment of the invention, a subscriber uses calling station 206 to dial access number 302 on paging card 300. Once call controller 106 is connected to calling station 206 as shown at block 140, the call controller prompts the subscriber for authorization number 304 (block 142). That prompt may be a tone that the subscriber recognizes as a prompt for the account code or it may be specific audio instructions prompting the subscriber to input the account code. In an alternate embodiment, it may be desirable to enter information such as access phone number 302 and account code 304 through alternative input/output modality such as a magnetic strip reader, bar code reader, or the like. For example, a magnetic code or bar code containing both phone number 302 and account number 304 may be scanned into calling station 206 using the appropriate. That information would then be used to connect to call controller 106.

Referring now to block 144, upon receiving account code 304, call controller 106, accesses account database 512 and determines whether account code 304 is valid. The validation process may include confirming that the account number exists and that money or credit units are available in the account. If account code 304 is invalid, call controller 106 checks to determine the number of times, during that phone connection, an incorrect authorization number was entered (block 148). If the number of attempts exceeds a predetermined number (e.g., 3) controller 106 will terminate the call (block 150). If the predetermined number of incorrect entries has not been reached, call controller 106 will again prompt for the correct authorization code 304 (block 142).

If the paging card number is valid, call controller 106 determines whether the subscriber has selected a preferred language for conducting transaction (block 180). If the connection is the first time for the subscriber to access the controller with that account number, no language preference will be recorded for that account, so call controller 106 will prompt for the desired language (block 182). When the menu of languages is reported to the subscriber, each available language is recited to the subscriber in that particular language along with a corresponding number that the subscriber is to input to choose the language.

Still referring to block 182, the subscriber selects a default language by pressing the corresponding push-button on telephone 206 or by using some other suitable input device, such as, for example, by using voice recognition circuitry or software or by including special function buttons on public phones. Next, call controller 106 records the subscriber's selection in memory 112 so that any subsequent connections between call controller 106 and the subscriber (i.e. the person using account code 304) will be conducted in the selected language without having to reelect the preferred language. Preferably, the information relating to the preferred language is stored in a preferred language reference database containing the language selections of all paging card users, for example in account database 512 where other data relating to the prepaid accounts are stored.

Referring now to block 146, call controller 106 next accesses two sectors 502, 510 in memory 112 to determine if any voice messages or phone numbers for the subscriber are stored in memory. If such exist, the subscriber is informed of the number of messages and phone numbers stored. Call controller 106 then prompts the subscriber to select a desired feature or go to a feature menu (block 154). In a preferred embodiment, the most frequently implemented features are printed on paging card 300 to act as a crib sheet. For example, the subscriber is prompted to enter a "1" for the speed dialing feature, a "2" to retrieve and listen to voice messages, a "3" to place a phone call to another phone number, and a "9" to go to an options menu.

Referring now to blocks 156 and 158, call controller 106 receives the subscriber's selection and determines the function to be performed. If no selection is made after a predetermined period of time (e.g., 10 seconds), or if an entry does not correspond to the options available, the call controller again prompts the subscriber for a selection (block 156).

Alternatively, if the call controller 106 detects inputs of "1," "2," "3," or "9," the call controller performs the corresponding function. In particular, if a "1" is detected, call controller 106 looks up the stored phone numbers left by callers from sector 502 in memory 112 (block 160). In a preferred embodiment, call controller 106 provides the subscriber the most recent phone number left by a calling party. However, if a phone number is marked by the calling party as urgent, it is presented to the subscriber first. Next, as shown in block 162, call controller 106 prompts the subscriber to connect to that number. If affirmative, call controller 106 dials the phone number and the subscriber is connected (block 164). Upon connection, the account balance of the subscriber in sector 512 is decreased for the duration of the call.

If the subscriber chooses not to place a call at this time to the first phone number, call controller 106 prompts the subscriber to exit the speed dial menu (block 166). If yes, call controller 106 returns to step 154 where the subscriber is again prompted for a menu selection. If the subscriber chooses not to exit the speed dial menu, call controller 106 proceeds to step 167 where it retrieves the next phone number in the Queue from sector 502. Referring now to block 168, call controller 106 next asks the subscriber if he would like to be connected to the selected number. If so, the controller moves on to step 164 where the number is dialed. If not, the call controller proceeds back to step 166. In this manner the subscriber can step through the list of stored phone.

Referring back to block 158, if the call controller 106 detects a "2," it proceeds to the voice messages menu (block 170) from which the subscriber may retrieve any stored messages. After the subscriber was finished listening to his messages, call controller 106 is routed back to step 154 where the subscriber is prompted for another selection.

If call controller 106 detects a "3" at block 158, call controller 106 prompts the subscriber for a phone number (block 172). Upon entering a number, the call controller then proceeds to step 164 where it places the call.

Finally, if call controller 106 at step 158 detects a "9," call controller 106 proceeds to the options menu where various other features or functions may be selected (block 174). For example, the options menu may include options for recharging or adding additional credit to the corresponding account for allowing the subscriber to configure a portion of the transaction data in accordance with a preferred format, preference and for generating and sending the subscriber a transaction summary, for changing various features of the voice messaging service like the personalized greeting, the subscriber security code, or the access security code, and for receiving faxes. After performing the requested function(s), call controller 106 returns to step 154 and prompts the subscriber for the next action. The subscriber terminates the connection with call controller 106 by simply hanging up the receiver.

Although the present invention is set forth herein in the context of the appended drawing figures, it should be appreciated that the invention is not limited to the specific forms shown. Various other modifications, variations, and enhancements in the design and arrangement of the call controller, the memory and data configurations, the paging card, and the like, as set forth herein may be made without departing from the spirit and scope of the present invention as set forth in the appended claims.

We claim:

1. A method of returning pages by charging an electronic account comprising the steps of:
   connecting a subscriber to a call controller;
   inputting an authorization associated with a prepaid electronic account stored in the call controller;
   determining, in said call controller, authorization validity;
   retrieving a calling party's phone number from the call controller;
   connecting, by said call controller, the subscriber to the calling party via the calling party's phone number; and,
   incrementally adjusting the electronic account.

2. The method of claim 1 further comprising the steps of:
   connecting the calling party to the call controller;
   inputting the calling party's phone number;
   storing the phone number in the call controller;
   signaling a subscriber's pager; and,
   communicating the calling party's phone number to the subscriber, wherein the call controller includes an incoming call trunk, a memory, an outgoing call trunk and a central processing unit.

3. The method of claim 2 wherein said communicating step is a visual indicia of the calling party's phone number on the pager.

4. The method of claim 2 wherein the electronic account is incrementally decreased while the subscriber is connected to the call controller.

5. The method of claim 2 further comprising the steps of:
   allowing the subscriber a predetermined number of attempts to enter a valid authorization; and,
   disconnecting the subscriber from the call controller when the predetermined number of attempts have been exhausted.

6. The method of claim 2 further including the step of informing the subscriber of the calling party's phone number prior to connecting the subscriber to the calling party's phone number.

7. The method of claim 1 further comprising the steps of:
   connecting a calling party to the controller;
   inputting a message from the calling party;
   storing the message in the call controller; and,
   communicating the calling party's message to the subscriber.

8. The method of claim 1 further including the step of incrementally increasing the electronic account by drawing against a second account having funds.

9. The method of claim 2 further comprising the steps of:
   entering a destination phone number;
   connecting the subscriber to the destination phone number; and,
   decreasing the electronic account during the connection between the subscriber and the destination number.

10. The method of claim 2 further comprising the steps of:
    recording the subscriber's transactions in a transaction database;
    formatting a portion of the transactions according to a subscriber's preference entered into the call controller; and,
    transmitting the formatted transactions to the subscriber.

11. The method of claim 2 further comprising the step of inputting a preferred language to be used between the call controller and the subscriber.

12. A call controller for use in a paging communications system comprising:
    a memory for storing a calling party's phone number;
    an account database for storing a balance associated with a subscriber's account code;
    an incoming call trunk for connecting the subscriber to the call controller;
    an outgoing call trunk for connecting the subscriber to the phone number;
    a central processing unit configured to receive the subscriber's account code, determine its validity, and increase or decrease the subscriber's account balance;
    wherein the memory and the outgoing call trunk exist in a common unit.

13. The call controller of claim 12 further comprising a second incoming call trunk for connecting to the calling party and for receiving the calling party's phone number.

14. The call controller of claim 13 further comprising a paging device for communicating the calling party's phone number to the subscriber, in combination with
    a radio transmitter for signaling the paging device and communicating the calling party's phone number.

15. The call controller of claim 14 wherein a signal from the transmitter includes data for communicating the phone number on the paging device.

16. The call controller of claim 12 further comprising:
    a message database for storing a calling party's message; and,
    means for retrieving the message.

17. The call controller of claim 12 further comprising a transaction database for storing the subscriber's transactions.

18. A paging system comprising:
    means for connecting a subscriber to a call controller;
    means for inputting an authorization associated with a prepaid electronic account stored in the call controller;
    means for determining authorization validity;
    means for retrieving a calling party's phone number from the call controller;
    means for the call controller to connect the subscriber to the calling party via the phone number; and,
    means for incrementally adjusting the account balance.

19. The paging system of claim 18 further comprising means for signaling a pager.

20. The paging system of claim 18 further including a means for sending the calling party's phone number to said paging device.

21. The paging system of claim 18 wherein the means for adjusting the account balance is increased while the subscriber is connected to the call controller.

22. The paging system of claim 18 further comprising:
    means for allowing a subscriber to make a predetermined number of attempts at entering a valid authorization; and,
    means for disconnecting the subscriber once the predetermined number of attempts have been exhausted.

23. The paging system of claim 18 wherein the means for adjusting the account balance decreases the account balance when subscriber retrieves messages from the message database.

24. The paging system of claim 18 further comprises:

means for entering a subscribers destination phone number; and, means for connecting the subscriber to the destination phone number, wherein the means for adjusting decreases the account balance.

25. The paging system of claim 18 further comprising:

means for recording data related to a subscriber's phone call;

means for preferentially formatting a portion of the data; and, means for transmitting the formatted data to the subscriber.

26. An article of manufacture including a computer usable medium having computer-readable computer program code means embodied therein for connecting a subscriber to a paging party through a call controller, said computer-readable program code means in said article of manufacture comprising:

means for storing a phone number of said paging party;

means for connecting said subscriber to said call controller;

means for receiving from said subscriber an authorization number, said authorization number associated with a prepaid account and a balance stored in said call controller;

means for determining whether said authorization number is valid;

means for dialing said phone number of said paging party; and means for connecting said subscriber to said paging party;

wherein said means for storing a phone number of said paging party and said means for connecting said subscriber to said paging party are a single unit.

27. The article of manufacture of claim 26 further comprising means for connecting to said paging party, means for receiving from said paging party said phone number, means for storing said phone number in said memory, and means for transmitting a signal to said paging device for alerting said subscriber of the call of said paging party.

28. The article of manufacture of claim 26 wherein said transmitting means includes means for sending data representing said phone number to said paging device.

29. The article of manufacture of claim 26 further comprising means for adding additional credit to said balance of said prepaid account while said subscriber is connected to said call controller.

30. The article of manufacture of claim 26 further comprising means for allowing said subscriber to make a predetermined number of attempts at entering a valid authorization number if said authorization number initially received is not valid, and means for terminating the connection between said subscriber and said call controller once said predetermined number of attempts have been exhausted.

31. The article of manufacture of claim 26 further comprising means for storing a message from a second paging party in a message database at said call controller, and means for retrieving said message from said message database for said subscriber upon connection to said call controller.

32. The article of manufacture of claim 31 further comprising means for decreasing said balance of said prepaid account in response to said subscriber retrieving said message from said message database.

33. The article of manufacture of claim 26 further comprising means for entering a destination phone number from said subscriber, means for connecting said subscriber to said destination phone number, and means for decreasing said balance of said prepaid account during a call connection to said phone number.

34. The article of manufacture of claim 26 further comprising means for recording data related to phone calls made by said subscriber with said authorization number, means for formatting a portion of said data in accordance with a format preference indicated by said subscriber, and means for transmitting said formatted data to said subscriber.

35. A method for responding to a verbal message using a paging system comprising the steps of:

connecting a calling party to a subscriber's pager;

storing a verbal message from the calling party in a call controller;

paging the subscriber;

connecting the subscriber to the call controller;

validating an authorization entered by the subscriber corresponding to a prepaid account stored in the call controller;

retrieving the verbal message from the call controller memory;

the call controller entering and connecting the subscriber to a destination phone number associated with the calling party; and, decreasing the account balance during the subscriber's connection to the destination phone number.

* * * * *